United States Patent [19]

Shtipelman

[11] Patent Number: 5,278,820
[45] Date of Patent: Jan. 11, 1994

[54] APPARATUS AND METHOD FOR A RADIAL ACCESS MECHANISM FOR A DISK PLAYER/RECORDER

[75] Inventor: Boris A. Shtipelman, Rochester, N.Y.

[73] Assignee: Eastman Kodak Company, Rochester, N.Y.

[21] Appl. No.: 952,042

[22] Filed: Sep. 28, 1992

[51] Int. Cl.⁵ .............................................. G11B 17/30
[52] U.S. Cl. ..................................... 369/219; 369/220
[58] Field of Search ................ 369/215, 219, 220, 221

[56] References Cited

U.S. PATENT DOCUMENTS

| | | | |
|---|---|---|---|
| 4,320,493 | 3/1982 | Kikuchi et al. | 369/220 |
| 4,453,245 | 6/1984 | Sugiyama et al. | 369/220 |
| 4,504,935 | 3/1985 | Jansen | 369/220 |
| 4,583,212 | 4/1986 | Koide et al. | 369/219 |
| 4,698,798 | 10/1987 | Faber et al. | 369/219 |
| 4,942,562 | 7/1990 | Suzaki | 369/219 |
| 5,175,723 | 12/1992 | Guha | 369/215 |
| 5,189,660 | 2/1993 | Caldwell | 369/219 |

*Primary Examiner*—Edward K. Look
*Assistant Examiner*—Michael I. Kocharov
*Attorney, Agent, or Firm*—William W. Holloway

[57] ABSTRACT

In a disk player/recorder apparatus, a radial access mechanism is disclosed in which a first guide rod is positioned on a mounting plate accurately with respect to the information storage medium. A head assembly engages the first guide rod through bushings which provide stringent tolerance requirements. The position of the head assembly is accurately controlled by the position of the first guide rod and the tolerances on the bushings. A second guide rod coupled to the mounting plate and a single bushing also supports and guides the head assembly, however, the tolerances on the components associated with the second guide rod are less stringent. Coupled to each of the guide rods is a bracket with a permanent magnet coupled thereto. The permanent magnets interact with the coils of linear motors coupled to the head assembly. The linear motors are arranged to minimize torque on the head assembly. The brackets and the guide rods form magnetic circuits for the associated permanent magnets and linear motors. Because of the reduced number of parts and the reduced tolerance requirements, the assembly of the radial access mechanism is simplified.

8 Claims, 2 Drawing Sheets

APPARATUS AND METHOD FOR A RADIAL ACCESS MECHANISM FOR A DISK PLAYER/RECORDER

BACKGROUND OF THE INVENTION

1. Field of Invention

The present invention is related to the field of information recording and retrieval, and more particularly to improvements in the apparatus controlling the radial position of the read/write head relative to a information storage disk or other storage medium. The position of the read/write head selects the portion of the disk to be accessed for the transfer of information with the remainder of the information storage system.

2. Description of the Related Art

In the related art, a variety of radial access mechanisms have been described which control the radial position of a read/write head in a disk player/recorder. In the most common implementation, a movable-mounted carriage supports the read/write head and has coupled thereto the moving coil of a linear motor, the linear motor positioning the carriage relative to the disk. These access mechanisms are complicated and consist of many different components which must be fabricated with a high degree of accuracy. In addition, the access mechanisms require a complex and time-consuming assembly. An example of the related art is found in U.S. patent application Ser. No. 07/811,867, filed on Dec. 23, 1991 for Boris A. Shtipelman entitled "Apparatus and Method for Optical Storage System Radial Access Actuator having Magnetic Field Bushings", and assigned to the assignee of the present invention.

A need has been felt for an improved linear mechanism which can provide the positional accuracy required for radial access in a disk player/recorder, but which is characterized by a high degree of simplicity, a low number of components, and relaxed requirements for accuracy both in the fabrication of components and in the assembly of the components.

SUMMARY OF THE INVENTION

It is an object of the present invention to provide an improved radial access mechanism for a read/write head of an information storage and retrieval system.

It is a feature of the present invention to provide a radial access mechanism for a read/write head of an information storage and retrieval system which has a reduced number of parts and which is relatively easy to assemble.

The present invention is directed to overcoming one or more of the problems set forth above. Briefly summarized, according to one aspect of the present invention, the radial access mechanism has two guide rods coupled to a mounting plate of the read/write head along which a head assembly can move. The head assembly is driven along the guide rods by a pair of linear motors coupled to the head assembly in such a manner as to minimize torque on the head assembly. The set of bushings which couples the head assembly to a first of the guide rods is adapted to provide stringent tolerance requirements on the position of the head assembly. This one guide rod is then positioned accurately with respect to other components coupled to the mounting block (e.g., the spindle in a disk system), the requirements on the accuracy of the positioning of the second guide rod and the tolerances on the coupling of the head assembly being correspondingly relaxed. A bracket is coupled to each guide rod and a permanent magnet is attached to the bracket. The magnetic fields from the permanent magnets interact with the linear motor coils coupled to the head assembly, magnetic circuits being formed by the guide rod and the coupled brackets. The head assembly is also the carriage for the optical and associated processing components of the read/write head.

These and other aspects, objects, features and advantages of the present invention will be more clearly understood and appreciated from a review of the following detailed description of the preferred embodiments and appended claims, and be reference to the accompanying drawings.

DESCRIPTION OF THE PREFERRED EMBODIMENTS

1. Detailed Description of the Figures

Figure 1:
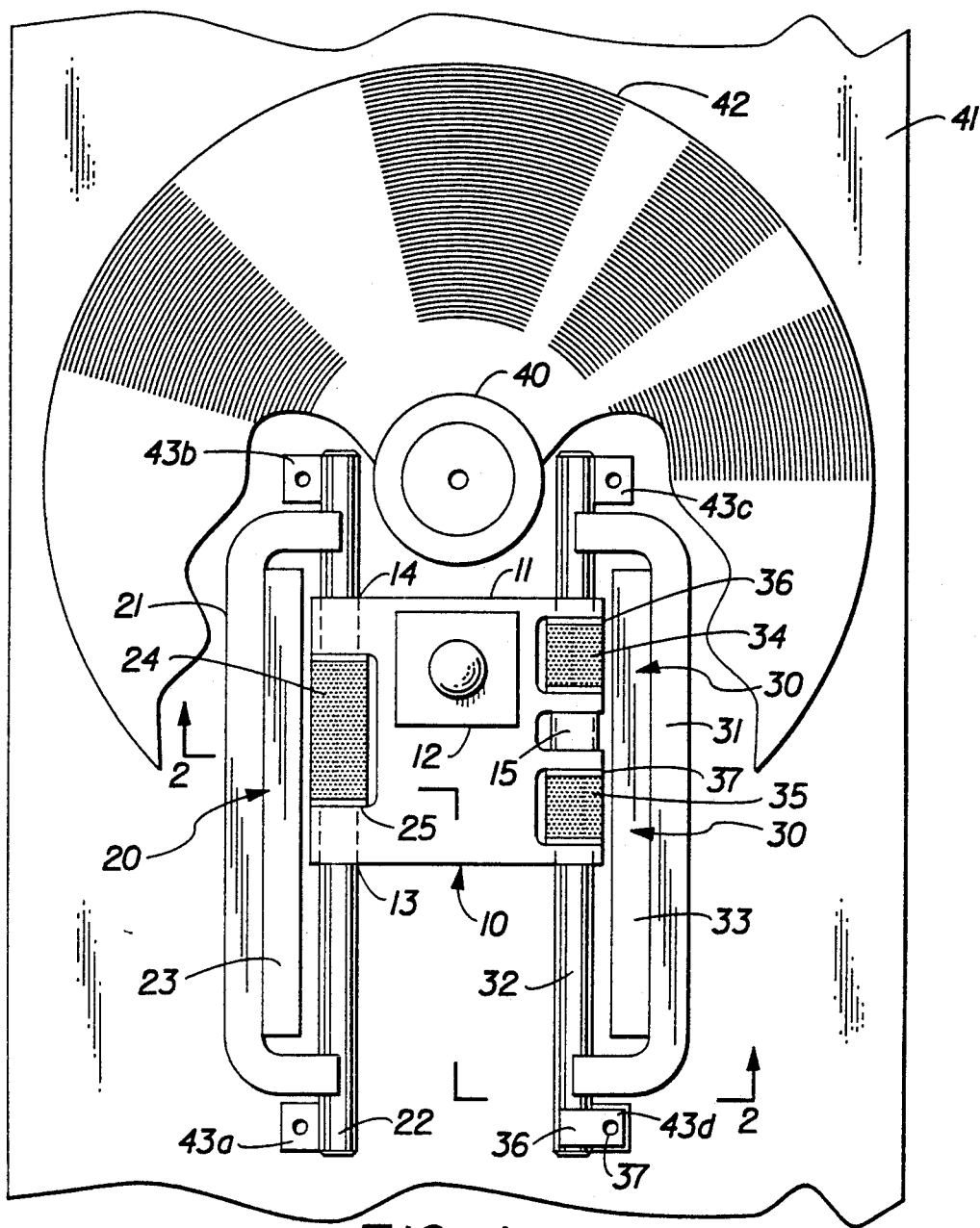
FIG. 1 is a top view of apparatus for controlling the radial position of a read/write head according to the present invention.

Referring now to FIG. 1, the disk 42 of the optical storage system is rotated by motor-driven spindle 40. The head assembly 10 travels in a radial direction relative to the disk 42 and is guided by guide rods 22 and 32 positioned on either side of the head. The guide rods 22 and 32 are coupled to disk drive mounting plate 41 by supporting elements 43a, 43b, 43c, and 43d. Each end of the rods is clamped with clips 36 and screws 37, only one set being shown in FIG. 1.

The head housing 11 of head assembly 10 is supported by three bushings. Two of the bushings, 13 and 14, have round openings and are located on one side of the housing at the front and the back ends of the head housing 11. Bushing 15 is positioned on the opposite side of head housing 11 approximately in its middle and has an elongated opening. The three bushings constrain the head housing to move along the radial direction of disk 42. Additionally, the accuracy in the guiding of the head housing 11 is determined by the position of guide rod 22. Consequently, the tolerances for the positioning of the second guiding rod 32 can be more relaxed. Therefore, if the seats for motor spindle assembly 40 and the guide rod 22 are machined in one set up, a relatively small effort has been expended to achieve the overall accuracy of the radial access mechanism.

The movement of the head assembly 11 is provided by two moving coil linear motors 20 and 30. Linear motor 20 has a single coil 24. Coils 34 and 35 form portions of linear motor 30. The coil 24 has round structure and is wound on bobbin 25. Coils 34 and 35 are wound on bobbins 36 and 37, respectively. The combined length of coils 34 and 35 are equal to the length of coil 24. When the three coils are connected in series, the motors 20 and 30 will develop the same driving force and no torque will be exerted on the head assembly 10. Each of the coils is located in an air gap with a magnetic field created by permanent magnets 23 and 33. In each linear motor, the magnetic flux passing through the rods is enclosed by brackets 21 and 31, brackets 21 and 31 being coupled to the associated permanent magnet. Both the rods and the brackets are fabricated from material having a high permeability, such as steel.

Figure 2:
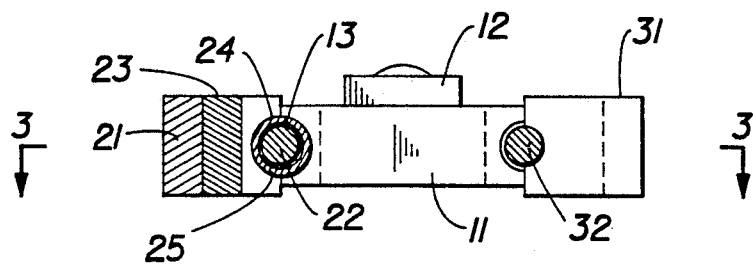
FIG. 2 is a sectional view along the 2—2 line for the radial position read/write head of FIG. 1.

Referring to FIG. 2, a cross-sectional view of the head assembly is shown. The relationship of the magnet 23, the guide rod 22, the coil 24, the bobbin 25 and the bracket 21 is shown.

Figure 3:
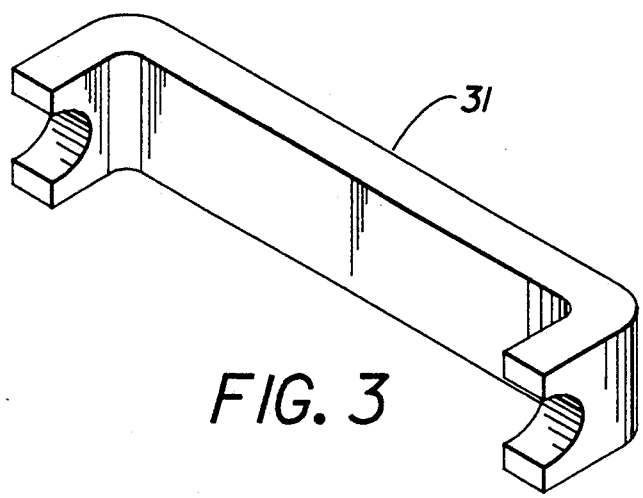
FIG. 3 is a perspective view of a flux returning bracket of the linear motor.

Referring to FIG. 3, a perspective view of the brackets 21 and 31 is shown. To simplify the head assembly mechanism and its fabrication, brackets 21 and 31 are formed from sheet material by the procedure of first, stamping out the correct configuration and then, bending the opposite ends at a 90° angle. The structure of the brackets 21 and 31 allows assembly to the remainder of the motors by bringing the brackets to the motors from the side. The magnetic force can keep the motor assembly together, or an adhesive or screws can be used to couple the brackets to the disk drive mounting plate 41.

Figure 4:
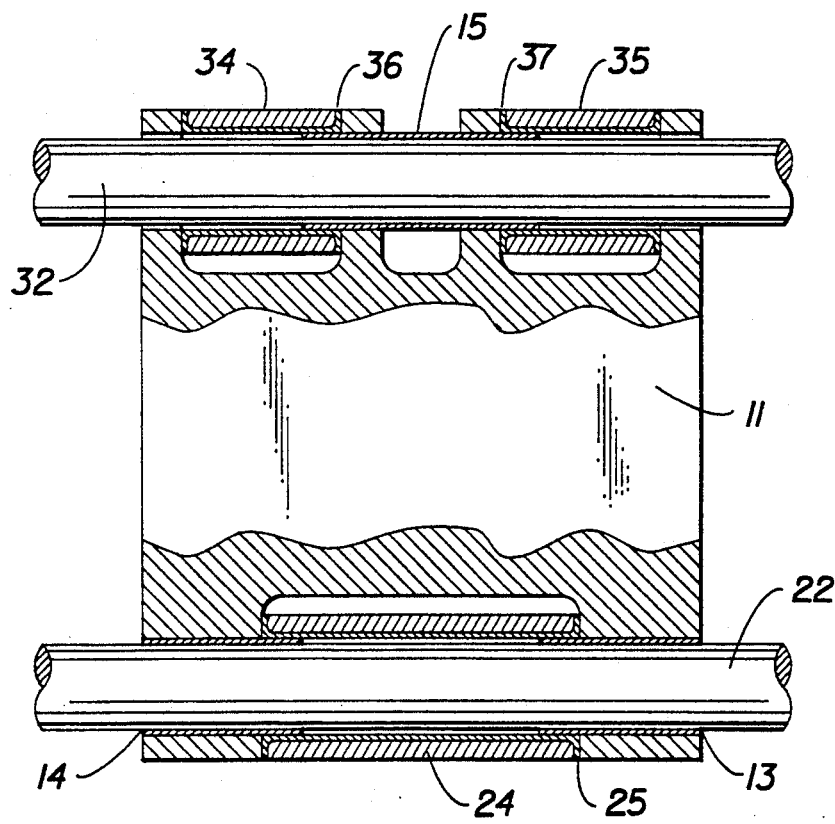
FIG. 4 is a sectional view along line 3—3 for the radial position read/write head of FIG. 3.

Referring to FIG. 4, the relative simplicity of assembling the coils and the head assembly is illustrated. The single coil 24 on one side of the head assembly is positioned by the opposite ends of bushing 13 and 14 extended in the coil bobbin 25. This arrangement keeps the coil perfectly concentric with rod 22 permitting the minimum air gap in motor 20. Coils 35 and 36 are similarly placed on the opposite side of the head and are positioned near the end of bushing 15 extended in the coil bobbins 36 and 37. Once again, a minimum air gap is provided for motor 30. For additional protection, each coil can be glued to head housing 11.

The guide rods 22 and 23 are used not only for guiding the head assembly. but also for carrying the magnetic flux in motors 20 and 30. To avoid saturation of the metal in the guide rods, the guide rods 22 and 23 are enlarged. Because of this configuration, the heat generated by the head assembly can be conducted through the guide rods and to the mounting plate 41.

2. Operation of the Preferred Embodiment

The head assembly of the present invention has relatively few components. Furthermore, the assembly of those components is a relatively simple process. First, the guide rods 22 and 32 are inserted into the bushings of the head assembly. The guide rods 22 and 32 are then mounted in the seats of mounting plate 41. The brackets 21 and 31, together with magnets 23 and 33, are positioned on opposite sides of the head assembly and bringing the brackets 21 and 31 in contact with the guide rods 22 and 32. The method of locating coils 24, 34, and 35 in the head housing and aligning the each coil with respect to the guide rods is particularly convenient. As indicated above, the ease of assembly is demonstrated by reference to FIG. 4 wherein the configuration of the head assembly maintains the coils perfectly concentric with rods 22 and 32 and permits a minimum air gap to be maintained in linear motors 20 and 30.

Referring once again to FIG. 1, the apparatus does not include a carriage for supporting the read/write head. Instead the head assembly 10 is the carriage itself, all of the required elements being placed in head housing 11. The head assembly can include, for example, the focus/tracking actuator 12 of the optical disk drive.

It will be now appreciated that there has been presented a radial access head for an information storage system which is characterized by a high degree of simplicity and a low number of components, low cost production and assembly, a new method of aligning coils in a motor keeping its air gap to a minimum, and a structure with an improved method of sinking heat generated during operation of the head assembly. As described above, the brackets 21 and 31 can be fabricated by stamping the brackets from a sheet stock and appropriate bending of the stamped bracket.

Operation of the mechanism of the present invention is believed to be apparent from the foregoing description and drawings, but a few words will be added for emphasis. The disclosed radial access mechanism has reduced requirements for tolerances. Only one of the guide rods need be positioned accurately with respect to the media, i.e., in the example of a disk system, with respect to the spindle. The reduced tolerance requirements result in more rapid assembly and fewer work items requiring rejection or reworking. Similarly, the relatively small number of components expedites assembly of the radial access mechanism. The focussing apparatus is a part of the head assembly and, consequently, results in a further reduction in the fabrication of the radial access mechanism. The coupling of the bracket along with the permanent magnet to the guide rods can be accomplished by the already present magnet force, or the magnet force can be used to position the bracket temporarily while a more permanent attachment procedure is undertaken. The technique disclosed for the fabrication of the bracket provides yet another efficiency in the fabrication of the radial access mechanism. Finally, the present configuration provides for a cooling of the head assembly by the conduction of heat across the relatively narrow air gap of the linear motor, through the guide rods, and into the mounting plate (heat sink).

While the invention has been described with reference to an information storage and retrieval system based on a disk information storage medium, it will be apparent that the invention is easily adapted to any system that require a positioning of the read/write head with respect to storage medium.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. In an information storage and retrieval system, said information storage and retrieval system having a mounting plate for positioning a medium containing information, a radial access mechanism comprising:

a first guide rod coupled to said mounting plate and having a predetermined position relative to said medium;

a head assembly having a first and a second bushing for slidably engaging said guide rod and for accurately positioning said head assembly relative to said medium;

a first linear motor slidably engaging said first guide with a minimum air gap and coupled to said head assembly wherein heat generated during operation of the head assembly can be conducted through said first guide rod and to said mounting plate;

a first bracket coupled to said first guide rod at locations not interfering with a travel of said head assembly;

a first magnet coupled to said first bracket and extending along a travel path of said first linear motor, wherein said first guide rod and said first bracket form a first magnetic circuit for magnetic flux from said first magnet;

a second guide rod generally parallel to said first guide rod, said second guide rod coupled to said mounting plate, wherein said head assembly includes a third bushing slidably engaging second guide rod;

a second linear motor slidably engaging said second guide with a minimum air gap and coupled to said head assembly wherein heat generated during operation of the head assembly can be conducted through said second guide rod and to said mounting plate;

a second bracket coupled to said second guide rod at locations not interfering with said travel of said head assembly; and a second magnet coupled to said second bracket, said second bracket and said second guide rod forming a second magnetic circuit for flux from said second magnet wherein said first linear motor has a single coil and wherein said second linear motor has two separated coil portions, the combined length of said two separated coil portions being equal to the length of said single coil portion.

2. The radial access mechanism of claim 1 wherein a position of said head assembly is slidably determined by a location of said first guide rod with respect to said mounting plate and said first and said second bushings.

3. The radial access mechanism of claim 1 wherein said storage medium is an optical disk.

4. The radial access mechanism of claim 1 wherein said first and second bushings are positioned on a front and a rear portion of said head assembly, said third bushing being positioned on an opposite side of said head assembly and generally midway between said front and said rear portion of said head assembly.

5. A radial access mechanism for providing optical interaction with a medium, a position of said medium being determined relative to a mounting plate, said radial access mechanism comprising:

a head assembly including optical and electrical components for interacting with said medium, said head assembly including a first and second bushing spatially separated on a first side of said head assembly, said head assembly including a third bushing on a second side of said head assembly, said head assembly including a first and a second linear motor coupled thereto;

a first guide rod coupled to said mounting plate and positioned within predetermined tolerances, said first and second bushing slidably engaging said first guide rod, said first linear motor slidably engaging said first guide rod with a minimum air gap and coupled to said head assembly wherein heat generated during operation of the head assembly can be conducted through said first guide rod and to said mounting plate;

a first bracket coupled to said first guide rod, wherein said first bracket does not interfere with a motion of said head assembly relative to said medium, said first bracket including a first portion fabricated from a magnetic material, said first bracket including a first permanent magnet interacting with said first linear motor, said first portion and said first guide rod forming a first magnetic circuit for magnetic flux from said first magnet;

a second guide rod coupled to said mounting plate, said third bushing slidably engaging said second guide rod, said second linear motor slidably engaging said second guide rod with a minimum air gap and coupled to said head assembly wherein heat generated during operation of the head assembly can be conducted through said second guide rod and to said mounting plate;

a second bracket coupled to said second guide rod, wherein said second bracket does not interfere with a motion of said head assembly relative to said medium, said second bracket including a second portion fabricated from a magnetic material, said second bracket including a second permanent magnet interacting with said second linear motor, said second portion and said second guide rod forming a second magnetic circuit for magnetic flux from said second magnet wherein said first linear motor has a single coil and wherein said second linear motor has coil portions on either side of said third bearing, the combined length of said coil portions being equal to the length of said single coil.

6. The radial access mechanism of claim 5 wherein said medium is an optical disk, said predetermined tolerances of said first guide rod being determined relative to a spindle mounted on said mounting plate, said spindle being coupled to said mounting plate and rotating said disk.

7. The radial access mechanism of claim 5 wherein said first and said second portions are fabricated by stamping a blank from sheet stock and bending said blank.

8. The radial access mechanism of claim 5 wherein said head assembly includes focus and tracking control means for focussing a radiation beam on a selected information track of said medium.

* * * * *